(No Model.)
A. W. THOMAS.
WHEEL TIRE AND FELLY.
No. 399,361. Patented Mar. 12, 1889.
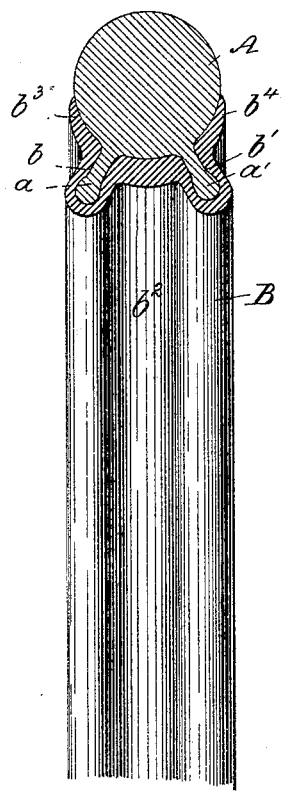
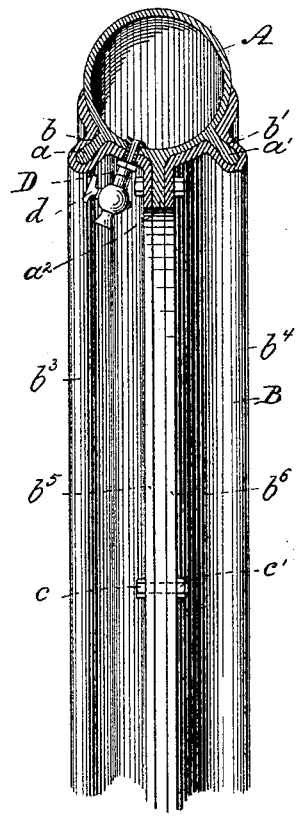
WITNESSES:
Hermann Bormann
Thomas M. Smith.
INVENTOR:
Amos W. Thomas,
By J. Walter Douglass.
ATT'Y:

UNITED STATES PATENT OFFICE.

AMOS W. THOMAS, OF PHILADELPHIA, PENNSYLVANIA.

WHEEL TIRE AND FELLY.

SPECIFICATION forming part of Letters Patent No. 399,361, dated March 12, 1889.

Application filed July 14, 1888. Serial No. 279,937. (No model.)

*To all whom it may concern:*

Be it known that I, AMOS W. THOMAS, a citizen of the United States, residing at the city of Philadelphia, in the county of Philadelphia and State of Pennsylvania, have invented certain new and useful Improvements in Tires and Fellies for the Wheels of Vehicles, of which the following is a specification.

My invention relates to a class of tires made of flexible or elastic material as opposed to those made of metal.

This invention is especially applicable to the road-wheels of bicycles, tricycles, and velocipedes; but, nevertheless, it is equally applicable to the road-wheels of carriages, wagons, and other rolling conveyances.

The principal object of my invention is to provide a flexible or elastic tire constructed or formed either solid or hollow, in order that it may be inflated by means of air, gas, water, or other liquid or fluid, and the tire provided with two or more ribs or projections for engagement with an improved felly made in one or more parts and adapted to receive and firmly hold the same in position in the outer face thereof by means of cement or other glutinous or cohesive material or substance, whereby a strong, durable, and serviceable tire and felly for the road-wheels of vehicles is produced.

The characteristic features of my invention will be more fully understood taken in connection with the accompanying drawings, forming part hereof, and in which—

Figure 1 is a transverse sectional view of a solid tire embodying the particular features of my invention, and mounted in the outer face of my improved felly made in one part, and such a tire and felly as are applicable to the road-wheels of bicycles, tricycles, or other rolling conveyances, the said improved felly being illustrated in this view partly in section and partly in elevation; and Fig. 2 is a similar view of a modified form of a tire embodying also the features of my invention, but in this instance consisting of a hollow tube with two ribs or projections and a central web engaged with and firmly held in the outer faces of a two-part felly of my improved construction, the felly being shown in this view partly in section and partly in elevation.

Referring to the drawings for a further description of my invention, A, Figure 1, is a solid tire made of rubber or other suitable flexible or elastic material and provided with ribs or projections $a$ and $a'$, having the outer portions thereof slightly enlarged for engagement in the grooves or channels or slits $b$ and $b'$ formed in the felly B. The felly B in the middle $b^2$ is curved, so that the exterior surface of the tire may bear very firmly against the same, and the sides $b^3$ and $b^4$ of the felly B, beyond the channels $b$ and $b'$ formed therein, are slightly curved, so that the tire may be secured to place in the face of the felly, and, furthermore, in order that they may serve as clamps or stays to prevent all possible lateral wabbling of the tire. The tire A is secured firmly in position in the face of the felly by means of cement or other glutinous or adhesive material.

In Fig. 2 is illustrated a tubular inflatable hollow tire, A, made of rubber or other suitable material, which, if desired, may have the tread portion in the formation of the tube made of tougher material than the felly-facing portion; or the tube may be thickened or re-enforced at the tread, if desired, in any suitable manner. Ribs or projections $a$ and $a'$ are formed, preferably, integral with the tube in its manufacture, and in some instances also provided with a central web, $a^2$. In such an instance the felly B is made in two parts, $b^3$ and $b^4$, with channels or grooves $b$ and $b'$ formed in said parts for the reception of the ribs or projections $a$ and $a'$ of the tire A. The web $a^2$ of the tire A is caused to engage between the flanges $b^5$ and $b^6$ of the two-part felly B, and the respective parts held firmly together by means of bolts $c$ and nuts $c'$. The tire is secured into the grooves $b$ and $b'$ and the faces of the two-part felly B by means of cement or other glutinous or adhesive material.

Through one of the parts of the felly B is introduced a tube, D, provided with a stopcock, $d$, for permitting of the inflation of the tire by means of air, gas, water, or other aeriform or gaseous fluid or liquid. The degree of compressibility of the tire may be regulated by the amount of the inflation thereof or by the tension of the inflating medium, which may be introduced under pressure.

I desire it to be understood that I do not wish to limit myself to the use of rubber for the formation of the tire, as leather, woven or textile fabric suitably treated to render it impervious to liquids or fluids, may be advantageously used. Preference, however, is given to rubber, owing to its particular adaptability for the purpose, and, moreover, because it is cheap and serviceable.

The particular advantage of constructing a tire and felly in the manner described and combining them together by means of cement or other glutinous or adhesive material is that all lateral strain brought to bear on the tire in use is entirely obviated, and a very strong and durable combined tire and felly, especially adapted for use in connection with the road-wheels of bicycles, tricycles, and other rolling conveyances, presented, and in which the tire is capable in a most satisfactory manner of withstanding friction, abrasion, and rough usage.

Having thus described the nature and objects of my invention, what I claim as new, and desire to secure by Letters Patent, is—

1. A flexible or elastic hollow tire provided with ribs formed integral therewith and firmly secured in a felly adapted to receive said tire, and a tube with a cock extending through the body of said felly and tire, substantially as and for the purposes set forth.

2. An inflatable tire provided with ribs and a web, in combination with a two-part felly adapted to receive said tire, and means, as described, for securing the ribs of said tire in said felly and clamping the web thereof between the parts of said felly, substantially as and for the purposes set forth.

In witness whereof I have hereunto set my signature in the presence of two subscribing witnesses.

AMOS W. THOMAS.

Witnesses:
W. A. WHITMORE,
H. BORMANN.